United States Patent

Sasaoka et al.

[11] Patent Number: 5,883,990
[45] Date of Patent: Mar. 16, 1999

[54] LOW TRANSMISSION LOSS OPTICAL FIBER HAVING A GRATING

[75] Inventors: Eisuke Sasaoka; Masumi Ito; Masayuki Nishimura, all of Yokohama, Japan

[73] Assignee: Sumitomo Electric Industries, Ltd., Osaka, Japan

[21] Appl. No.: 889,954

[22] Filed: Jul. 10, 1997

[30] Foreign Application Priority Data

Sep. 9, 1996 [JP] Japan .................................. 8-237856

[51] Int. Cl.$^6$ ........................................ G02B 6/34
[52] U.S. Cl. .............................. 385/37; 385/10; 385/126; 372/102
[58] Field of Search ................................ 385/37, 10, 123, 385/124, 125, 126; 372/6, 102

[56] References Cited

U.S. PATENT DOCUMENTS 5,703,978  12/1997  DiGiovanni et al. ........................ 385/37

FOREIGN PATENT DOCUMENTS

WO 86/01303  2/1986  WIPO .

OTHER PUBLICATIONS

L. Dong et al., 22nd European Conference on Optical Communication –ECOC '96, Oslo, "Cladding Mode Coupling Suppression in Fibre Bragg Gratings Using Fibres With a Depressed Cladding", MoB.3.3, pp. 1.53–1.56.

Delevaque et al., "Optical Fiber Design for Strong Gratings Photoimprinting With Radiation Mode Suppression", pp. 2–5.

Wada et al., General Conference of Electronic Information Communication Society, 1996, "Fiber Bragg Gratings", pp. 1–8.

"Theory of Optical Waveguides", Katsunari Okamoto 1992, Corona Publishing Co., Ltd., Tokyo, Japan.

*Primary Examiner*—Phan T. H. Palmer
*Attorney, Agent, or Firm*—Pillsbury Madison & Sutro LLP

[57] ABSTRACT

The present invention relates to an optical fiber grating as an optical component comprising an optical fiber having a core and a cladding, and a grating photowritten in the optical fiber. In particular, in the optical fiber grating in accordance with the present invention, the optical fiber into which the grating periodically changing the refractive index in the waveguide along the advancing direction of light is photowritten has a depressed cladding type refractive index profile. Accordingly, when the configuration of the optical fiber having a depressed cladding type refractive index, employed as the object in which the grating is photowritten, is changed, the stability in characteristics as the optical component or the like can easily be improved.

5 Claims, 6 Drawing Sheets

LOW TRANSMISSION LOSS OPTICAL FIBER HAVING A GRATING

BACKGROUND OF THE INVENTION

1. Field of the Invention

The present invention relates to an optical component which selectively reflects a specific wavelength of propogating light and, in particular, to an optical fiber grating in which a core region of an optical fiber has a refractive index that changes periodically along its optical axis.

2. Related Background Art

Recently, as optical fiber communications technology advances, networks are becoming complex and signal wavelengths are being multiplexed thereby requiring a higher grade of system configuration. In such an optical communication system, the importance of optical circuit devices (optical components) has been increasing.

A fiber type element, as an example of typical configurations in optical components, is advantageous, for example, in that it has a small size and low insertion loss and can easily connect with an optical fiber. Known as such a fiber type element is a fiber type filter.

Recently, it has been well-known the refractive index of the core of silica type optical fibers that is doped with germanium oxide changes upon being irradiated with ultraviolet radiation. Studied and developed as a fiber type filter utilizing such a photoinduced refractive index change is an optical fiber type diffraction grating (optical fiber grating).

In this specification, the term "optical fiber grating" refers to an optical component comprising an optical fiber and a grating photowritten in the core region of the optical fiber.

The optical fiber type diffraction grating reflects a light component of light advancing through the optical fiber having a specific wavelength. In general, in order to make such a diffraction grating, a part of a core region of an optical fiber is irradiated with ultraviolet rays so as to form an area (grating) having a refractive index that changes periodically along the longitudinal direction (corresponding to a traveling direction of signal lights) of the core region.

In this specification, the center wavelength of light to be reflected by a grating is referred to as the reflection wavelength of the grating.

SUMMARY OF THE INVENTION

Figure 1:
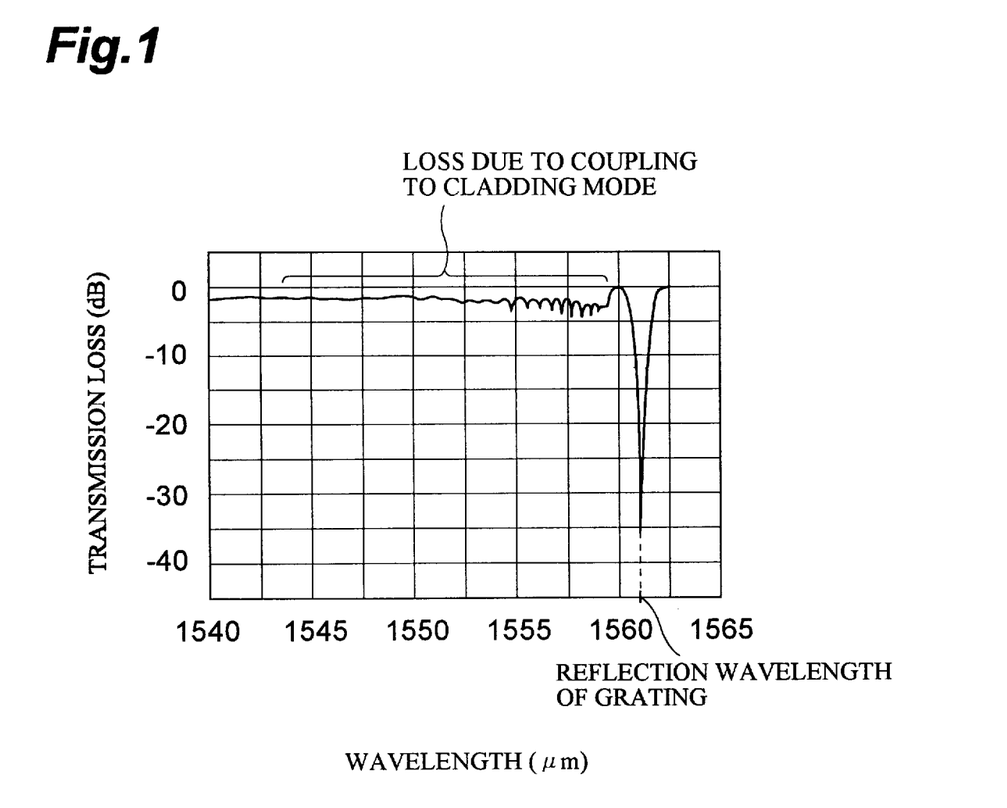
FIG. 1 is a graph showing transmission loss in a conventional optical fiber grating.

The inventors have overcome the following problems of the prior art. Namely, when a diffraction grating exists in an optical fiber, a part of its propagation mode is coupled to its cladding mode or converted into a higher-order mode. Since light components of the cladding mode and higher-order mode do not propagate to the light-receiving end, a level fluctuation occurs. As shown in FIG. 1, the loss due to coupling to the cladding mode occurs in a region with a wavelength shorter than the reflection wavelength of the grating in particular. In wavelength division multiplexing transmission, such a loss causes the waveform to warp, thereby deteriorating the transmission quality. Studied as means for restraining this cladding mode from being generated are a method in which Ge is also added to the cladding so as to photowrite a grating in the whole cladding and core region (OFC-'95, PD 5-2 to 5-5) and a method in which an optical fiber is made with greater core diameter and relative refractive index than those of the typical optical fiber such that not only the fundamental mode but also higher-order modes can be propagated (the 1996 Institution of Electronics, Information, and Communication Engineers General Conference, SB-11-3).

In the former method, since fluorine is evenly added to the cladding so as to uniformly lower the refractive index, strictness is required for its manufacture control in terms of evenness as well as amount. In the latter method, excitation should be carried out without generating higher-order modes, while the higher-order modes may occur due to bending of an optical fiber or the like.

It is thus an object of the present invention to provide an optical fiber grating in which the ratio of optical power propagating through the core region is increased so as to attain a higher coefficient of optical power confinement, and which can easily be made and handled in the same manner as typical optical fibers.

Figure 2A:
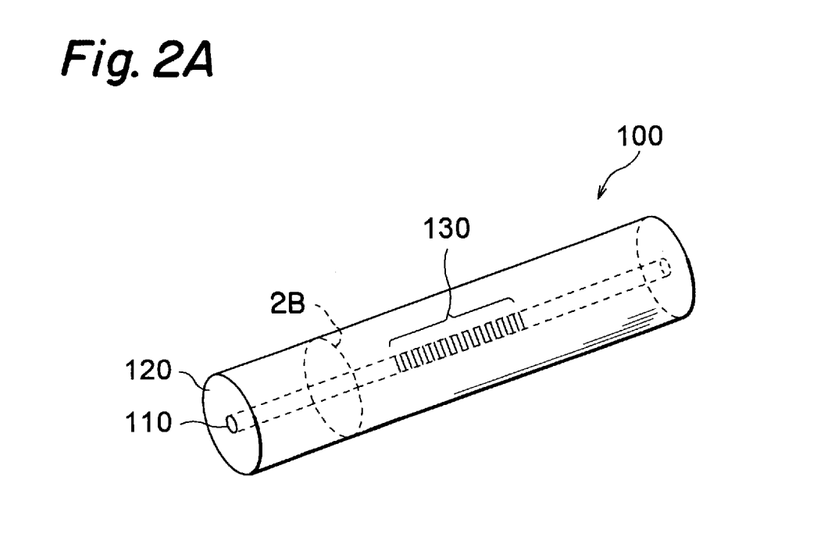
FIGS. 2A and 2B are a perspective and cross-sectional view, respectively, showing a schematic configuration of an optical fiber grating in accordance with the present invention.
Figure 2B:
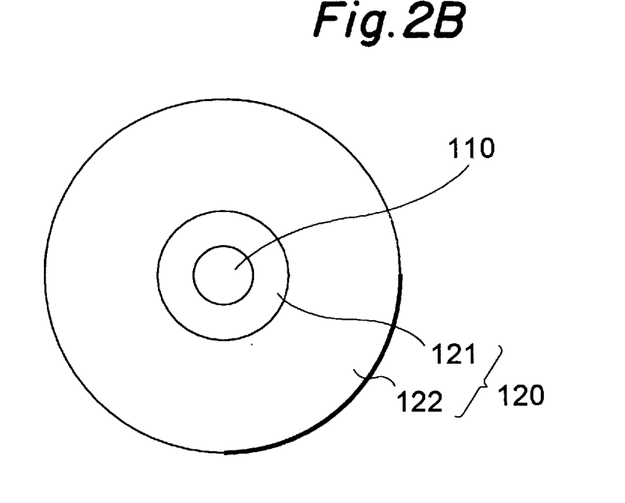

The optical fiber grating in accordance with the present invention is an optical component comprising an optical fiber having a core region and a cladding region, and a grating photowritten in the core region of the optical fiber. In particular, the optical fiber into which the grating is photowritten has a refractive index profile of depressed cladding type. Namely, as shown in FIG. 2, for example, an optical fiber grating 100 in accordance with the present invention comprises a core region 110 having a predetermined refractive index; a cladding region 120 which is disposed around the outer periphery of the core region 110 and has a lower refractive index than the core region 110; and a grating 130 photowritten in the core region 110 along the longitudinal direction of the core region 110.

In particular, the cladding region 120 is constituted by a first cladding 121 which is disposed around the outer periphery of the core region 110 and has a refractive index (minimum refractive index) $n_2$ lower than a maximum refractive index $n_1$ of the core region 110; and a second cladding 122 which is disposed around the outer periphery of the first cladding 121 and has a refractive index (mean refractive index) $n_3$ higher than the minimum refractive index $n_2$ of the first cladding 121 but lower than the maximum refractive index $n_1$ of the core region 110. The core region 110, the first cladding 121, and the second cladding 122 realize a depressed cladding type profile having a depression at a portion corresponding to the cladding region 120. As the configuration of the optical fiber having a depressed cladding type refractive index profile, employed as the object into which the grating is photowritten, is changed, the stability in characteristics as an optical component or the like can easily be improved.

Preferably, the optical fiber grating 100 in accordance with the present invention has a normalized frequency V satisfying the following condition:

$$V = \pi a \cdot (n_1^2 - n_2^2)^{1/2}/\lambda \geq 2.4$$

wherein a is the diameter of the core region 110 and $\lambda$ is the wavelength of light to be propagated.

Namely, when the normalized frequency V is 2.4 or higher (first requirement), the outer diameter or refractive index of the core region 110 is made greater. Accordingly, the ratio of optical power propagating through the core region 110 becomes greater than the ratio of optical power bleeding to and propagating on the outside of the core region 110. As a result, in the optical fiber grating 100, the coefficient of confinement is increased, thereby reducing the ratio of coupling to the cladding mode. Here, in the specification, the ratio of optical power of light in the fundamental mode propagating through the core region 110 to the whole optical power in the fundamental mode is referred to as the coefficient of power confinement.

In addition, it is preferred that the refractive index $n_3$ of the second cladding 122 be greater than effective refractive index $N_2$ of the second-order mode but smaller than effective refractive index $N_1$ of the fundamental mode.

When the refractive index $n_3$ of the second cladding 122 is thus made greater than the effective refractive index $N_2$ of the second-order mode but smaller than the effective refractive index $N_1$ of the fundamental mode (second requirement), though the fundamental mode can propagate through the core region 110, higher-order modes cannot propagate therethrough.

Accordingly, when the second requirement is satisfied together with the first requirement, only the fundamental mode can propagate through the core region 110, and the optical power in the fundamental mode can be made sufficiently greater than that of the component bleeding into the cladding region 120, allowing the light to propagate while the optical power is confined within the core region 110.

The second requirement is obtained when the distance between the core region 110 and the second cladding 122, i.e., thickness of the first cladding 121, is adjusted. Specifically, in the optical fiber grating 100 in accordance with the present invention, it is preferred that the width of the first cladding 121 in the diameter direction be at least 2 $\mu$m but not greater than 10 $\mu$m.

The optical fiber grating 100 in accordance with the present invention has a configuration in which the diameter or refractive index of the core region 110 is increased so as to attain a higher coefficient at which the optical power is confined into the core region 110, while the size (width in the diameter direction) of the first and second claddings 121 and 122 and the distance between the core region 110 and the second cladding 122 are restricted such that only the fundamental mode can propagate.

In addition, in the optical fiber grating 100 in accordance with the present invention, the mode field diameter (MFD) with respect to a predetermined wavelength of light to be propagated is preferably at least 7 $\mu$m but not greater than 11 $\mu$m. With the MFD thus set, the optical fiber grating can be connected, with a low loss, to typical optical fibers for communications.

The present invention will be more fully understood from the detailed description given hereinbelow and the accompanying drawings, which are given by way of illustration only and are not to be considered as limiting the present invention.

Further scope of applicability of the present invention will become apparent from the detailed description given hereinafter. However, it should be understood that the detailed description and specific examples, while indicating preferred embodiments of the invention, are given by way of illustration only, since various changes and modifications within the spirit and scope of the invention will be apparent to those skilled in the art from this detailed description.

DESCRIPTION OF THE PREFERRED EMBODIMENTS

In the following, optical fiber gratings in accordance with the present invention will be explained with reference to FIGS. 2A to 7B.

As shown in FIGS. 2A and 2B, an optical fiber grating 100 in accordance with the present invention is an optical component comprising an optical fiber constituted by a core region 110 having a predetermined refractive index and a cladding region 120 having a refractive index lower than that of the core region 110, and a grating 130 photowritten therein such that the refractive index of the core region 110 periodically changes along the longitudinal direction (corresponding to a traveling direction of signal lights) of the core region 110. In particular, in the optical fiber into which the grating 130 is photowritten, the cladding region 120 comprises a double cladding structure constituted by a first cladding (inner cladding) 121 disposed around the outer periphery of the core region 110 and a second cladding (outer cladding) 122 disposed around the outer periphery of the first cladding 121.

Figure 3A:
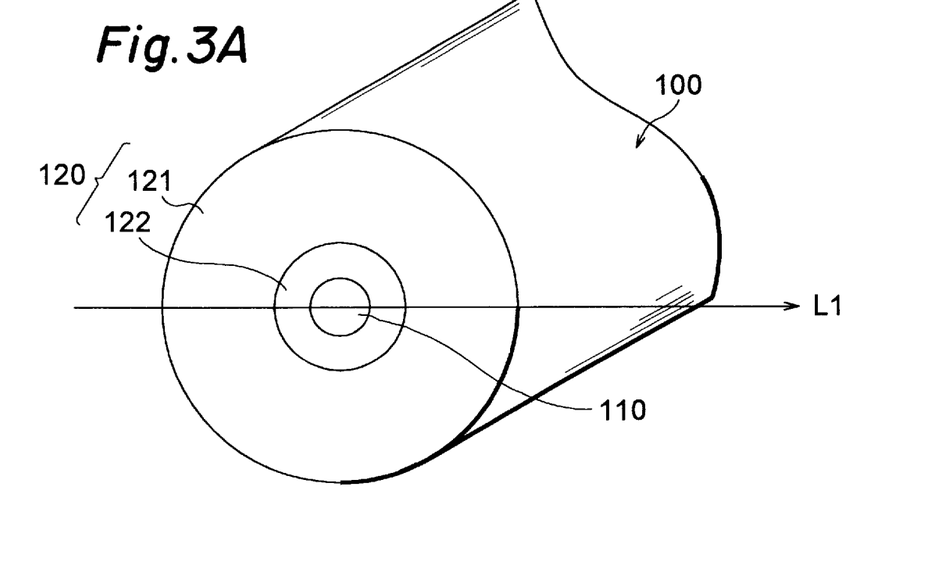
FIGS. 3A and 3B are a view showing the cross-sectional configuration and refractive index profile, respectively, of an optical fiber for yielding the optical fiber grating in accordance with the present invention.
Figure 3B:
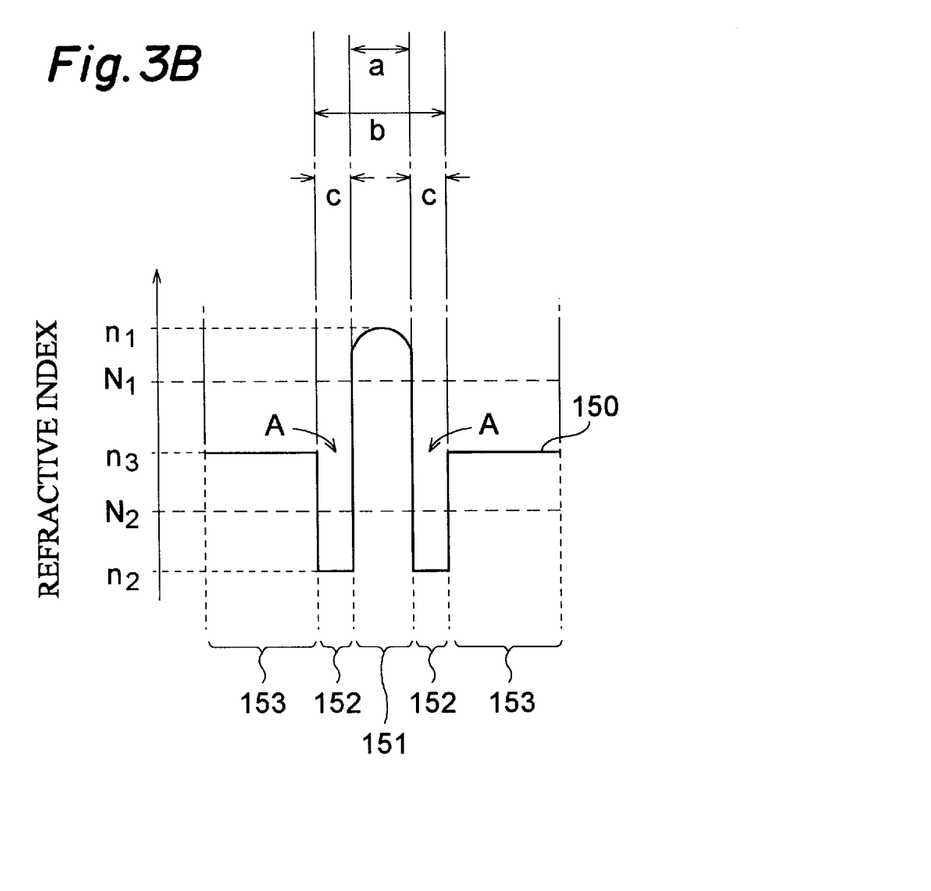

FIGS. 3A and 3B are views showing the cross-sectional configuration and refractive index profile of an optical fiber for yielding the optical fiber grating 100 in accordance with the present invention. Formed in the core region 110 is the diffraction grating 130 by which the refractive index of the core region 110 periodically changes along the optical axis (coinciding with the longitudinal direction of the core region 110). The object (optical fiber) in which the grating 130 is disposed has the core region 110 with a diameter of a and a maximum refractive index $n_1$, the first cladding 121 having a refractive index $n_2$ (with an outer diameter of b and a thickness of c=(b−a)/2 in the diameter direction), and the second cladding 122 having a refractive index $n_3$, which are successively disposed toward the outside. The grating 130 is photowritten into the core region 110. The refractive indices satisfy the relationship of $n_1>n_3>n_2$.

The abscissa of a refractive index profile 150 shown in FIG. 3A corresponds to positions in the cross section of the optical fiber grating 100 (on a plane perpendicular to the traveling direction of signal lights propagated therethrough) on line L1. Also, in the refractive index profile 150, regions 151, 152, and 153 respectively correspond to the refractive index (maximum refractive index) $n_1$ at positions in the core region 110, the refractive index (minimum refractive index) $n_2$ at positions in the first cladding 121, and the refractive index (mean refractive index) $n_3$ at positions in the second cladding 122, on the line L1. Further, in the optical fiber grating 100, the refractive index profile of the core region 110 in its diameter direction is of a graded index type in which the refractive index of the first cladding 121 is lower than that of the other regions, thereby forming a depression A in the refractive index profile 150 of the optical fiber grating 100. In particular, a refractive index profile provided with such a depression A is referred to as a depressed cladding type profile.

Coefficient of Optical Power Confinement

In an optical fiber thus configured, grating 100 (having the core region 110 with a diameter of a), when the normalized frequency $V=\pi a \cdot (n_1^2-n_2^2)^{1/2}/\lambda$ with respect to signal light having a wavelength of $\lambda$ is set to 2.4 or higher, the diameter or refractive index of the core region 110 is made greater, thereby increasing the ratio of optical power confined into the core region 110 (coefficient of power confinement becomes higher). Also, this condition secures a single-mode operation of the optical fiber grating 100.

Elimination of Higher-Order Mode

On the other hand, as explained in conjunction with the prior art, in an optical fiber comprising a core and a cladding, when the diameter or refractive index of the core is simply increased, not only the fundamental mode but also higher-order modes propagate through the core. When the higher-order modes propagate through the core together with the fundamental mode, coupling is likely to occur among the modes. Such a state is unfavorable in terms of maintenance of quality in communications. Accordingly, a condition is satisfied in which, though the fundamental mode is propagated, the higher-order modes cannot exist in the core, i.e., the refractive index $n_3$ of the second cladding 122 is greater than the effective refractive index $N_2$ of the second-order mode but smaller than the effective refractive index $N_1$ of the fundamental mode in the refractive index distribution shown in FIG. 3. This condition can be realized when an optical fiber comprising the first cladding 121 and the second cladding 122 (optical fiber having a depressed cladding type profile) is employed.

Specifically, in the optical fiber configured as shown in FIGS. 3A and 3B, the propagation constant of the second-order mode is determined, and then the effective refractive index $N_2$ of the second-order mode is determined therefrom. Thereafter, the refractive index $n_2$ of the second cladding 122 is determined under an additional condition that it is greater than the effective refractive index $N_2$ of the second-order mode but smaller than the effective refractive index $N_1$ of the fundamental mode.

Here, Okamoto, "Hikaridoharo No Kiso (Fundamentals of Light Waveguide)," (Tokyo: Corona Publishing Co., Oct. 12, 1992), pp. 224–228, discloses a method of determining a propagation constant $\beta$ by a finite element analysis in the case of the fundamental mode (m=0). The propagation constant can also be determined in the case of higher-order modes according to the method disclosed in this publication. Also, the propagation constant $\beta$ and effective refractive index $n_e$ have the following relationship therebetween:

$$n_e = \beta/k$$

wherein k is a wave number, which is given by the reciprocal of the wavelength.

Based on the refractive index distribution of the optical fiber into which the grating is to be photowritten, the inventors have determined the power distribution concerning light having a predetermined wavelength (used wavelength) according to numerical analysis by a finite element method. Further, based on this result, the coefficient of confinement, which is the ratio of the optical power confined into the core region to the total power, is determined. Also, while the calculation wavelength is successively changed, the effective refractive index of the second-order mode is determined by a finite element method based on the refractive index distribution of the optical fiber, and a wavelength at which the thus determined effective refractive index of the second-order mode coincides with the refractive index of the second cladding is defined as the cutoff wavelength. Details will be explained in the following embodiments.

(Embodiment 1)

Figure 4A:
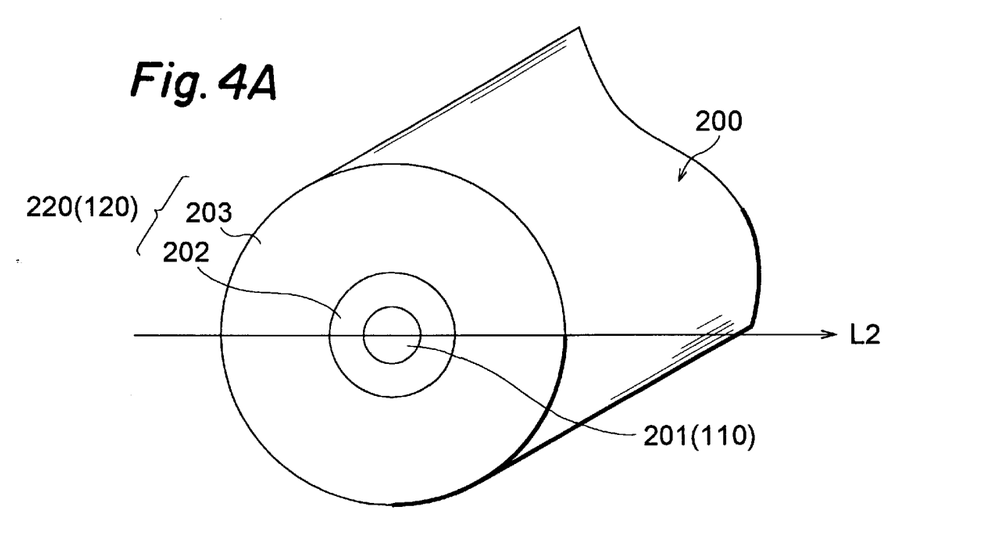
FIGS. 4A and 4B are a view showing the cross-sectional configuration and refractive index profile, respectively, of an optical fiber for yielding the optical fiber grating in accordance with Embodiment 1 of the present invention.
Figure 4B:
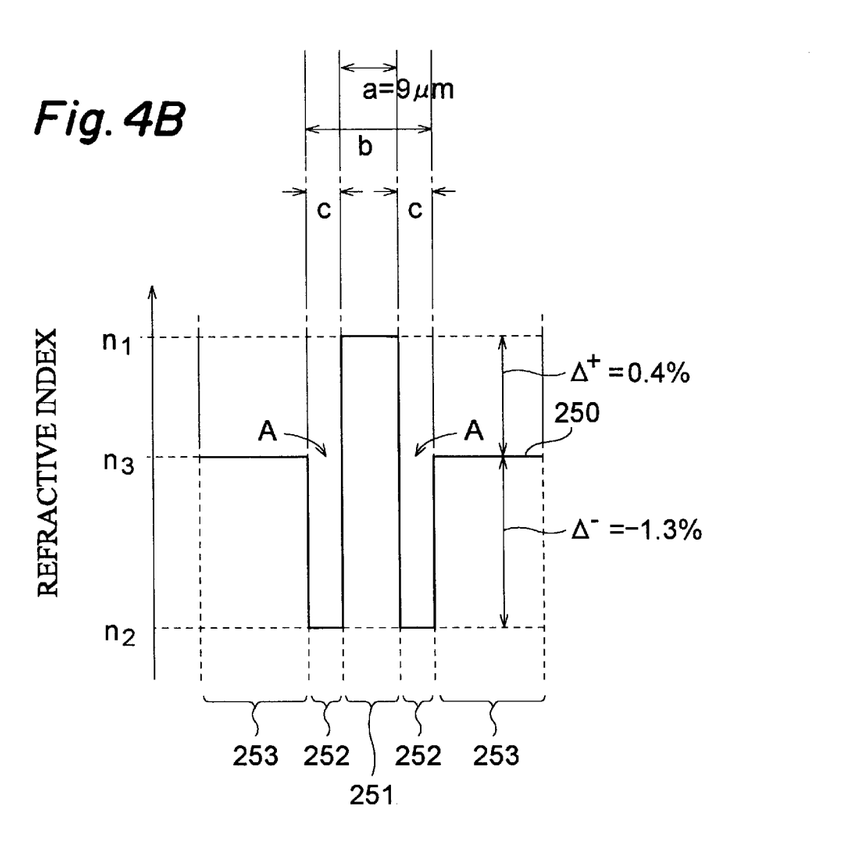

FIGS. 4A and 4B are views showing the cross-sectional configuration and refractive index profile of an optical fiber for yielding the optical fiber grating in accordance with Embodiment 1 of the present invention. As in the case of the optical fiber 100 shown in FIGS. 3A and 3B, an optical fiber 200 in Embodiment 1 comprises a core region 201 (with a maximum refractive index $n_1$ and a diameter of a) into which the grating 130 is photowritten, a first cladding 202 (with a minimum refractive index $n_2$, an outer diameter of b, and a thickness of c=(b−a)/2 in the diameter direction) disposed around the outer periphery of the core region 201, and a second cladding 203 (with a mean refractive index $n_3$) disposed around the outer periphery of the first cladding 202. The first and second claddings 202 and 203 constitute a cladding region 220 (corresponding to the cladding region 120 in FIG. 3). The optical fiber 200 shown in FIGS. 4A and 4B has a depressed cladding type refractive index profile 250 as well.

In this embodiment, relative refractive index difference $\Delta^+$ of the core region 201 with respect to the second cladding 203 is 0.4%, whereas relative refractive index difference $\Delta^-$ of the first cladding 202 with respect to the second cladding 203 is −1.3%. The diameter a of the core region 201 is 9.0 μm. The normalized frequency V with respect to light having a wavelength of 1,550 nm determined on the basis of the maximum refractive index $n_1$ of the core region 201, minimum refractive index $n_2$ of the first cladding 202, and diameter a of the core region 201 is 4.866. Also, the relative refractive index difference of the effective refractive index $N_2$ of the second-order mode with respect to the second cladding 203 is −0.29%, whereby the mean refractive index $n_3$ of the second cladding 203 is greater than the effective refractive index $N_2$ of the second-order mode.

The abscissa of the refractive index profile 250 shown in FIG. 4A corresponds to the positions in the cross section of the optical fiber grating 200 (on a plane perpendicular to the traveling direction of signal lights propagated therethrough) on line L2. Also, in the refractive index profile 250, regions 251, 252, and 253 respectively correspond to the refractive index (maximum refractive index) $n_1$ at positions in the core region 201, the refractive index (minimum refractive index) $n_2$ at positions in the first cladding 202, and the refractive index (mean refractive index) $n_3$ at positions in the second cladding 203, on the line L2. Further, in this embodiment, the refractive index profile of the core region 201 in its diameter direction is of a step index type in which the refractive index of the first cladding 202 is lower than that of the other regions, thereby forming a depression A in the refractive index profile 250 of the optical fiber 200.

Here, the relative refractive index difference $\Delta^+$ of the core region 201 with respect to the second cladding 203 and the relative refractive index difference $\Delta^-$ of the first cladding 202 with respect to the second cladding 203 are given as follows:

$$\Delta^+ \approx (n_1-n_3)/n_3$$

$$\Delta^- \approx (n_2-n_3)/n_3$$

In the specification, the relative refractive index between each pair of the regions are expressed in terms of percentage.

Also, the relative refractive index difference Δ of the region having a refractive index lower than that of the second cladding 203 is expressed as a negative value.

Figure 5:
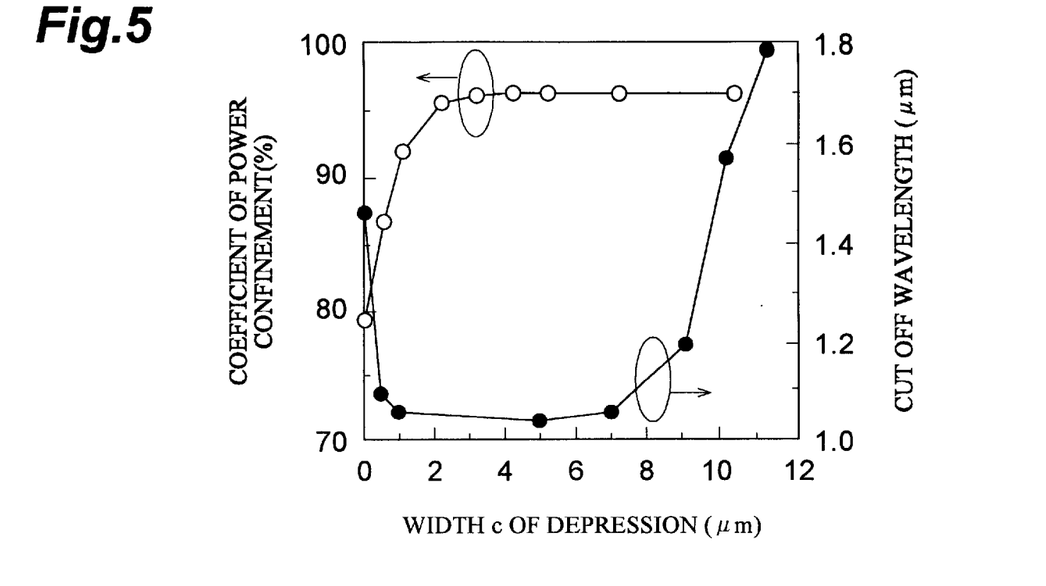
FIG. 5 is a graph showing theoretical values of coefficient of power confinement and cutoff wavelength with respect to the width of the depression (corresponding to the first cladding) in the refractive index profile in the optical fiber shown in FIG. 4.

Here, while the parameters mentioned above are made constant, the distance between the core region and the second cladding (width of the depression) is changed, whereby the change in cutoff wavelength of the optical fiber in accordance with the present invention is determined by numerical calculation. Also, while the wavelength is changed, its level at which the effective refractive index $N_2$ of the second-order mode coincides with the refractive index of the second cladding is defined as the cutoff wavelength. Also, the coefficient of confinement of the fundamental mode in the light having a wavelength of 1.55 μm is determined. The graph of FIG. 5 shows thusly obtained values.

The coefficient of confinement given by the ratio of the optical power not bleeding from the core region into the cladding region to the whole optical power of the fundamental mode is as high as 95% or more when the width of the depression (corresponding to the width of the first cladding) is at least 2 μm. On the other hand, within the range where the width of the first cladding is 0.5 to 10 μm, the second-order mode having a wavelength not shorter than 1.55 μm is cut off, allowing only the fundamental mode to propagate through the core region.

Namely, when the width of the first cladding is set to a level which is at least 2 μm but not exceeding 10 μm, the coefficient of confinement can be raised to 95%, and only the fundamental mode can be caused to propagate while preventing the higher-order modes from propagating.

In the following, a method of making the optical fiber grating in accordance with Embodiment 1 will be explained. First, the optical fiber 200 (see FIGS. 4A and 4B) is prepared such that the diameter of the core region 201 doped with $GeO_2$ is 9 μm, the relative refractive index difference $Δ^+$ of the core region 201 with respect to the second cladding 203 is 0.4%, the relative refractive index difference $Δ^-$ of the first cladding 202 with respect to the second cladding 203 is −1.3%, the distance between the core region 201 and the second cladding 203 (width c of the first cladding 202 in the diameter direction) is 5 μm, and the outer diameter of the second cladding 203 is 125 μm.

Subsequently, this optical fiber 200 is coated with a resin and then subjected to a hydrogen injection processing in a high-pressure hydrogen atmosphere. Thereafter, a part of the coating (area where the grating is to be photowritten) is removed, and the resulting exposed portion is irradiated with ultraviolet rays so as to photowrite a diffraction grating in the core region 201 over a length of 10 mm with a pitch of 0.53 μm, thereby yielding an optical fiber grating such as that shown in FIG. 2A. For example, International publication No. WO 86/01303 discloses a method for forming a refractive grating into the core portion in an optical fiber.

The measured reflectance of the optical fiber grating thus obtained in accordance with Embodiment 1 is 99% or higher with respect to light having a wavelength of 1,551 nm to 1,552 nm (corresponding to the reflection wavelength of the grating). The measured transmission loss of this optical fiber grating is 0.1 dB or less with respect to light having a wavelength of 1,530 nm to 1,550 nm (light having a wavelength shorter than the reflection wavelength of the grating).

Figure 6A:
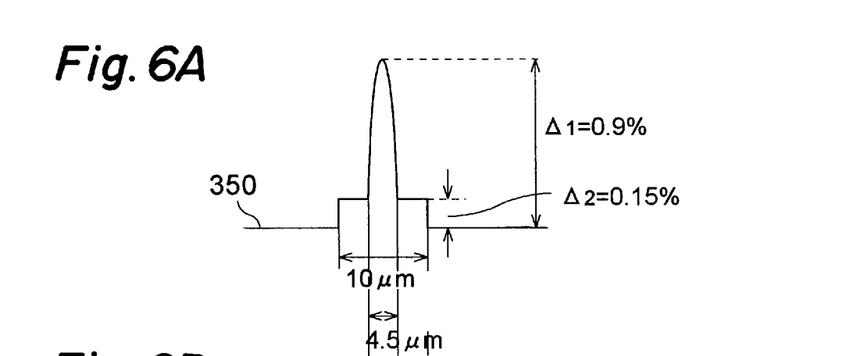
FIGS. 6A and 6B are a view showing the cross-sectional configuration and refractive index profile, respectively, of a standard dispersion-shifted fiber.
Figure 6B:
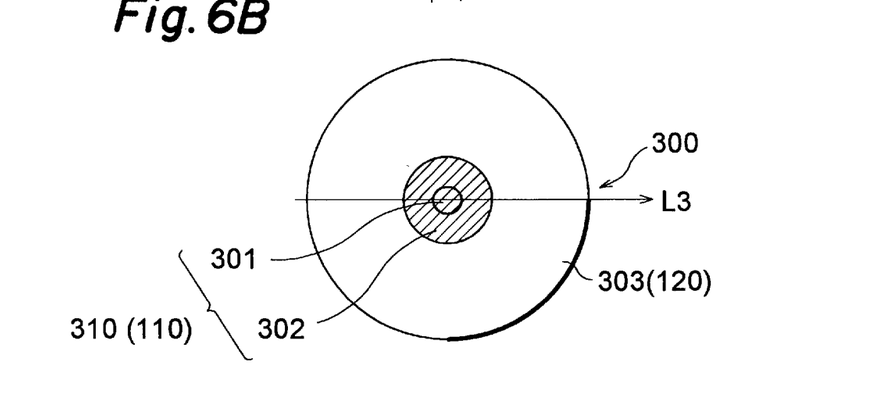

When a standard dispersion-shifted fiber such as a dispersion-shifted fiber 300 shown in FIG. 6 was provided with a similar diffraction grating and its reflection characteristic was measured, its reflectance was 97% or higher with respect to the light having a wavelength of 1,551 nm to 1,552 nm. Also, when its transmission loss was measured, the loss with respect to the light having a wavelength of 1,530 nm to 1,550 nm was as large as 2.3 dB, and a loss caused by the coupling to cladding mode was observed.

As shown in FIGS. 6A and 6B, in the dispersion-shifted fiber 300 prepared in this experiment, a core region 310 comprises an inner core 301 and an outer core 302, while yielding a dual core type refractive index profile 350. The refractive index profile 350 indicates the refractive indices of positions in the cross section of the optical fiber grating 200 on line L3. Further, a cladding region 303 is disposed around the outer periphery of the core region 310. The outer diameter of the inner core 301 is 4.5 μm. The outer diameter of the outer core 302 is 10 μm. Relative refractive index difference $Δ_1$ of the inner core 301 with respect to the cladding region 303 is 0.9%, whereas relative refractive index difference $Δ_2$ of the outer core 302 with respect to the cladding region 303 is 0.15%.

As explained in the foregoing, it has been confirmed that, in the optical fiber grating in accordance with Embodiment 1, since the coefficient of optical power confinement into the core region is improved, the transmission loss occurring at the wavelength shorter than the reflection wavelength of the grating is greatly reduced as compared with the conventional optical fiber in which a grating is photowritten, and the refection characteristic can be improved.

Also, when the optical fiber grating in accordance with Embodiment 1 is fusion-spliced to dispersion-shifted fibers having a mode field diameter (MFD) of 8.0 μm, it has been confirmed that the connection loss is 0.1 dB per sample, whereby the optical fiber grating in accordance with Embodiment 1 can be connected, with a low loss, to typical dispersion-shifted fibers.

(Embodiment 2)

Figure 7A:
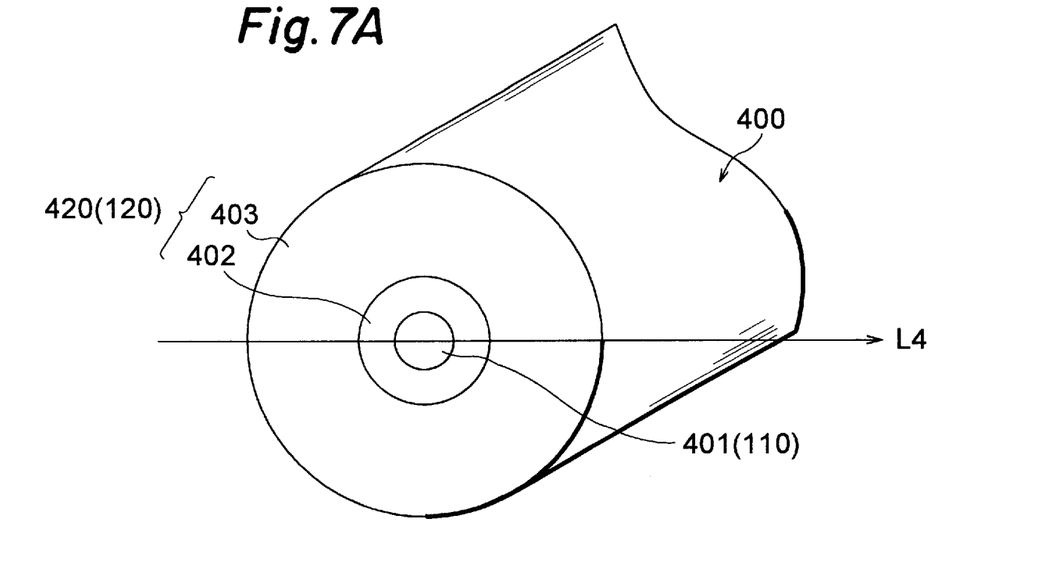
FIGS. 7A and 7B are a view showing the cross-sectional configuration and refractive index profile, respectively, of an optical fiber for yielding the optical fiber grating in accordance with Embodiment 2 of the present invention.
Figure 7B:
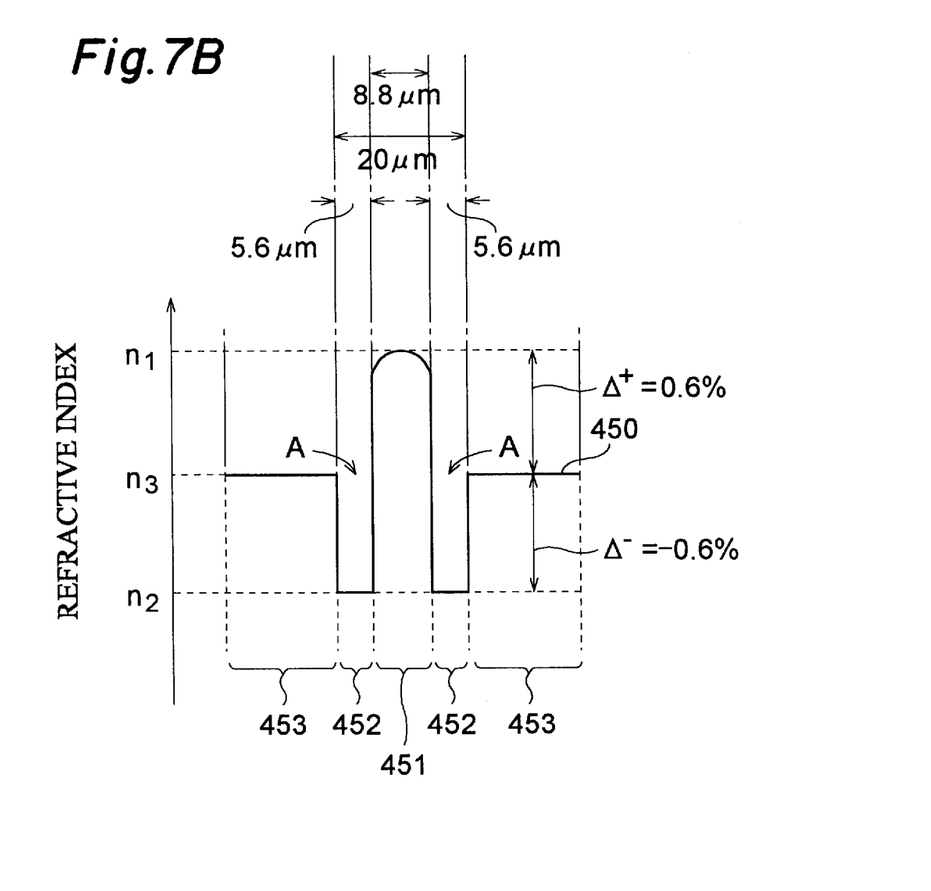

FIGS. 7A and 7B are views showing the cross-sectional configuration and refractive index profile of an optical fiber 400 for yielding the optical fiber grating in accordance with Embodiment 2 of the present invention. As with the optical fibers 100 and 200 respectively shown in FIGS. 2A, 2B, 3A and 3B the optical fiber 400 comprises a core region 401 (with a maximum refractive index $n_1$ and a diameter of a) into which the grating 130 is photowritten, a first cladding 402 (with a minimum refractive index $n_2$, an outer diameter of b, and a thickness of c=(b−a)/2 in the diameter direction) disposed around the outer periphery of the core region 401, and a second cladding 403 (with a mean refractive index $n_3$) disposed around the outer periphery of the first cladding 402. The first and second claddings 402 and 403 constitute a cladding region 420 (corresponding to the cladding region 120 in FIG. 3A). The optical fiber 400 shown in FIGS. 7A and 7B has a depressed cladding type refractive index profile 450 as well.

In this embodiment, the relative refractive index difference $Δ^+$ of the core region 401 with respect to the second cladding 403 is 0.6%, whereas the relative refractive index difference $Δ^-$ of the first cladding 402 with respect to the second cladding 403 is −0.6%. The diameter a of the core region 401 is 8.8 μm. The diameter of the first cladding 402 is 20 μm.

The normalized frequency V with respect to light having a wavelength of 1,550 nm determined on the basis of the maximum refractive index $n_1$ of the core region 401, minimum refractive index $n_2$ of the first cladding 402, and diameter a of the core region 401 is 4.007. Also, the relative refractive index difference of the effective refractive index $N_2$ of the second-order mode with respect to the second cladding 403 is −0.08%, whereby the mean refractive index $n_3$ of the second cladding 403 is greater than the effective refractive index $N_2$ of the second-order mode.

The abscissa of the refractive index profile 450 shown in FIG. 7A corresponds to the positions in the cross section of the optical fiber grating 400 (on a plane perpendicular to the traveling direction of signal lights propagated therethrough) on line L4. Also, in the refractive index profile 450, regions 451, 452, and 453 respectively correspond to the refractive index (maximum refractive index) $n_1$ at positions in the core region 401, the refractive index (minimum refractive index) $n_2$ at positions in the first cladding 402, and the refractive index (mean refractive index) $n_3$ at positions in the second cladding 403, on the line L4. Further, in this embodiment, the refractive index profile of the core region 401 in its diameter direction is of a graded index type in which the refractive index of the first cladding 402 is lower than that of the other regions, thereby forming a depression A in the refractive index profile 450 of the optical fiber 400. Also in this embodiment, the relative refractive index difference $\Delta^+$ of the core region 401 with respect to the second cladding 403 and the relative refractive index difference $\Delta^-$ of the first cladding 402 with respect to the second cladding 403 are defined in the same manner as those in the above-mentioned Embodiment 1, each being expressed in terms of percentage.

In the following, a method of making the optical fiber grating in accordance with Embodiment 2 will be explained. First, the optical fiber 400 (see FIGS. 7A and 7B) is prepared such that the diameter of the core region 401 doped with $GeO_2$ is 8.8 μm, the relative refractive index difference $\Delta^+$ of the core region 401 with respect to the second cladding 403 is 0.6%, the relative refractive index difference $\Delta^-$ of the first cladding 402 with respect to the second cladding 403 is −0.6%, the distance between the core region 401 and the second cladding 403 (width c of the first cladding 402 in the diameter direction) is 5 μm, and the outer diameter of the second cladding 403 is 125 μm.

Subsequently, this optical fiber 400 is coated and then subjected to a hydrogen injection processing in a high-pressure hydrogen atmosphere. Thereafter, a part of the coating (area where the grating is to be photowritten) is removed, and the resulting exposed portion is irradiated with ultraviolet rays so as to photowrite a diffraction grating over a length of 10 mm with a pitch of 0.53 μm, thereby yielding an optical fiber grating such as that shown in FIG. 2A.

The measured reflectance of the optical fiber grating thus obtained in accordance with Embodiment 2 is 99% or higher with respect to light having a wavelength of 1,552 nm to 1,553 nm (corresponding to the reflection wavelength of the grating). The measured transmission loss of this optical fiber grating is 0.2 dB or less with respect to light having a wavelength of 1,530 nm to 1,550 nm (light having a wavelength shorter than the reflection wavelength of the grating).

In view of the foregoing results, it has been confirmed that, in the optical fiber grating in accordance with Embodiment 2, as in the case of Embodiment 1, as the coefficient of optical power confinement into the core region is improved, the transmission loss occurring at the wavelength shorter than the reflection wavelength of the grating is greatly reduced as compared with the conventional optical fiber in which a grating is photowritten, and the reflectance can be improved.

Further, after the optical fiber grating in accordance with Embodiment 2 was accommodated in a package in order to protect the exposed portion thereof (portion from which the coating had been removed), both ends of the optical fiber grating were fusion-spliced to dispersion-shifted fibers each having an MFD of 8.0 μm. The connection loss in this case was 0.1 dB per sample.

In the present invention, as explained in the foregoing, since the ratio of optical power propagating through the core region is made greater than that bleeding into and propagating through the cladding region, so as to yield a higher coefficient of optical power confinement, the loss caused by the coupling to cladding mode can be lowered.

Also, since the grating is photowritten into an optical fiber having a double cladding structure (depressed cladding type profile) constituted by the first and second claddings, higher-order modes can be suppressed as the thickness of the first cladding is adjusted, whereby only the fundamental mode can propagate through the core region, enabling high-quality multiplex communications.

Further, since the diameter or refractive index of the core region of the optical fiber grating in accordance with the present invention can be adjusted selectively, its mode field diameter can be fitted to that of typical optical fibers for communications, whereby connection can be realized with a low loss.

From the invention thus described, it will be obvious that the invention may be varied in many ways. Such variations are not to be regarded as a departure from the spirit and scope of the invention, and all such modifications as would be obvious to one skilled in the art are intended for inclusion within the scope of the following claims.

The basic Japanese Application No. 237856/1996 filed on Sep. 9, 1996 is hereby incorporated by reference.

What is claimed is:

1. An optical fiber grating comprising:

a core having a maximum refractive index $n_1$;

a first cladding provided around an outer periphery of said core, said first cladding having a refractive index $n_2$ lower than the maximum refractive index $n_1$ of said core;

a second cladding provided around an outer periphery of said first cladding, said second cladding having a refractive index $n_3$ higher than the refractive index $n_2$ of said first cladding and lower than the maximum refractive index $n_1$ of said core; and a grating photowritten in said core along a longitudinal direction of said core, said grating reflecting a component of light propagating through said core having a predetermined wavelength.

2. An optical fiber grating according to claim 1, wherein said optical fiber grating has a normalized frequency V satisfying the following condition:

$$V = \pi a \cdot (n_1^2 - n_2^2)^{1/2} / \lambda \geq 2.4$$

wherein a is a diameter of said core and $\lambda$ is a wavelength of light to be propagated.

3. An optical fiber grating according to claim 1, wherein the refractive index $n_3$ of said second cladding is greater than an effective refractive index $N_2$ of a second-order mode and smaller than an effective refractive index $N_1$ of a fundamental mode.

4. An optical fiber grating according to claim 1, wherein said first cladding has a width of at least 2 μm but not greater than 10 μm in a diameter direction thereof.

5. An optical fiber grating according to claim 1, wherein said optical fiber grating has a mode field diameter of at least 7 μm and not greater than 11 μm with respect to a predetermined wavelength of light to be propagated.

* * * * *